J. A. BOWDEN.
PRESSURE GAGE.
APPLICATION FILED OCT. 21, 1912. RENEWED NOV. 23, 1917.
1,319,138. Patented Oct. 21, 1919.
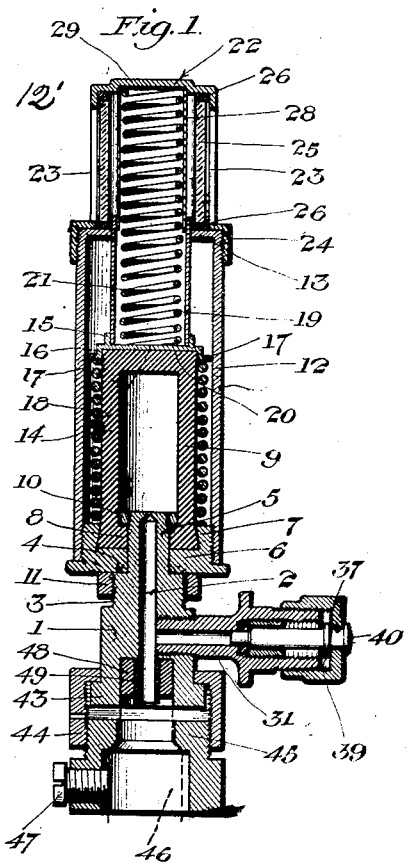
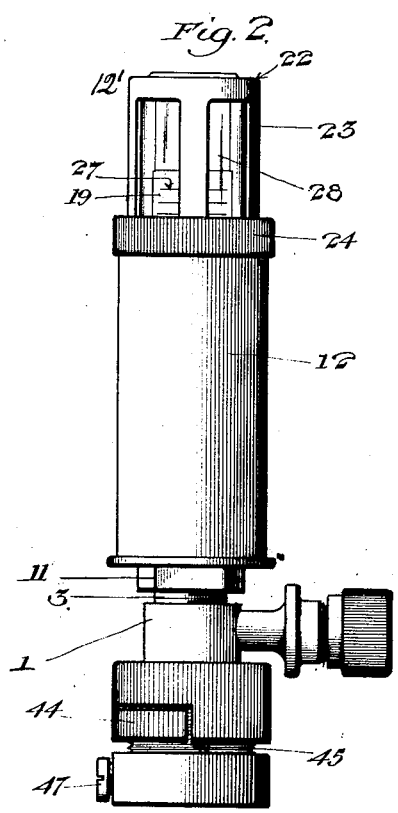
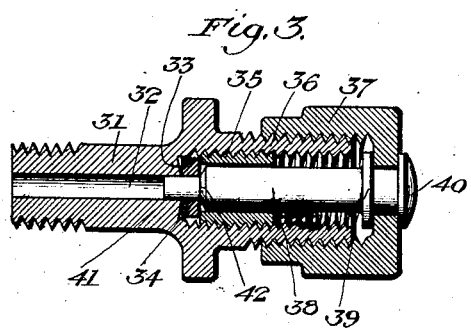
Witnesses:
Inventor:
Junius A. Bowden,

UNITED STATES PATENT OFFICE.

JUNIUS A. BOWDEN, OF LOS ANGELES, CALIFORNIA, ASSIGNOR TO A. SCHRADER'S SON, INCORPORATED, OF NEW YORK, N. Y., A CORPORATION OF NEW YORK.

PRESSURE-GAGE.

1,319,138.      Specification of Letters Patent.      Patented Oct. 21, 1919.

Application filed October 21, 1912, Serial No. 727,081. Renewed November 23, 1917. Serial No. 203,514.

*To all whom it may concern:*

Be it known that I, JUNIUS A. BOWDEN, a citizen of the United States, residing at Los Angeles, in the county of Los Angeles and State of California, have invented a new and useful Pressure-Gage, of which the following is a specification.

This invention relates to pressure gages adapted for use on valve stems of pneumatic tires to be carried permanently thereon, yet capable of being readily detached or attached.

The device is an improvement over similar devices shown in previous applications of mine, Serial Nos. 581,673, 666,601 and 714,897, and one object of the present invention is to simplify and lower the cost of the construction without sacrificing and cheapening the construction.

Another important object of the invention is to reduce the length.

Another object is to provide an improved inlet to gage having a combined cap and valve mechanism.

Other objects relate to details of construction and will be brought out in the following description.

Referring to the drawings:

Figure 1 is a vertical cross section through the device.

Fig. 2 is a side elevation of the device, showing the gage bar in a position indicating a pressure of seventy pounds.

Fig. 3 is an enlarged longitudinal section through the air inlet valve.

The device comprises a body 1 having a longitudinal air passage 2 and having a threaded portion 3 and shoulder 4, with a stem 5. A collar 6 rests against the shoulder 4 and is provided with an externally threaded flange 7 beveled internally as shown, to receive the lower flange 8 of a rubber air chamber 9. A nut 10 within the air chamber is screwed on the threaded upper end of the stem 5 and bears against the internal flange 8 of the air chamber, securely holding the air chamber in position. A nut 11 is screwed on the threaded portion 3 and forces the flange 8 of the air chamber up tight against the nut 10, making an air tight joint.

Screwed over the flange 7 is a tubular casing comprising a body portion 12 and a tubular extension 12′ on an end of said body portion. The body portion 12 is of even diameter throughout and has an internal flange 13 formed at its upper end. On the upper end of the air chamber 9 is a cap 14 with an upwardly directed flange 15 and has a flange 16 projecting down to receive the upper end of the air chamber and has a radial flange 17 which has a diameter slightly less than the casing 12 and forms a guide for the air chamber and parts reciprocated therewith within the casing. A spiral spring 18 surrounds the air chamber 9 and the coils are arranged close together, the purpose of this spring being to prevent radial expansion of the air chamber, but not appreciably interfere with the longitudinal expansion of the air chamber. The spring 18 is confined by the flange 17.

The extension 12′ preferably comprises a guard 22 which is connected by longitudinal arms 23 with a sleeve 24 which is internally threaded and screwed on the upper end of the casing 12. A glass tube 25 is arranged within the arms 23 and packing 26 is arranged at each end of the glass tube to prevent admission of dust or moisture. A gage bar comprising a tube 19 is arranged above the cap 14 which rests within the flange 15 on the cap 14 and the tube 19 is slidable in the flange 13 of the casing. A coil spring 21 is arranged within the tube 19 with its lower end resting against the cap 14, while the outer end of the spring is retained by the guard 22. The gage bar 19 is movable into view within the glass tube 25 as shown in Fig. 2, and is provided with indicating marks 27 for determining the position of the gage bar and consequent relative pressure.

A sleeve 28 covers the upper portion of spring 21 and the tube 19 telescopes therewith. To hold the sleeve 28 central, the guard 22 has an offset portion 29 which receives the upper end of the sleeve 28. The function of the sleeve 28 is to hide the coils of the spring from view and make a contrast between its outer surface and the gage bar, when the latter is moved up so that the position of the gage bar may be more easily seen. In addition to this, the sleeve 28 also guides the spring 21 and holds the upper coils of the spring in proper alinement, insuring even resistance to the pressure. The lower end of the tube 19 is held in position by a flange 15 formed on the cap 14, which tightly grips the tube 19.

Screwed into the body 1 is an air inlet tube 31 shown enlarged in detail in Fig. 3, and formed with an air passage 32 and a beveled shoulder 33 against which shoulder rests a flexible washer 34. The washer 34 is retained in position by a thin sleeve 35 which is screwed into the internally threaded nipple 36. The nipple 36 is also externally threaded and screwed thereon is a cap 37. A pin 38 is carried bodily by the cap 37 and has a flange 39 and head 40 by means of which the pin is swiveled in the cap 37. The pin 38 has a reduced end 41 and a beveled shoulder 42 which fits against the washer 34 when the cap 37 is screwed onto the nipple. The flange 39 and head 40 hold the pin 38 steadily in alinement with the hole in the washer 34 and air passage, so that when the cap is screwed onto the nipple, the pin easily passes into the washer 34 and air passage 31, while the large portion of the pin readily enters the tube sleeve 35. The object of this form of cap is to effect the air closure at a point within the outer rim of the nipple which is liable to defacement and consequent difficulty of making a perfect airtight closure. When located within the nipple as herein shown, the washer 34 is protected from injury and when the pin 38 is screwed in, the beveled shoulder 42 closes tightly against the inner rim of the washer 34 and effectually retains the air. The other edge of the washer 34 is likewise equally firmly pressed against the beveled shoulder 33 to prevent escape of air at that point. In addition to this, the washer being located within the nipple enables the contact area of the closure parts to be much smaller with the consequent greater ease of retaining the air and securing more perfect fit of the closure parts with each other.

The lower end of the body 1 has a flange 43 on which is swiveled a knurled nut 44, the latter being screwed on a sleeve 45 which is attached to the valve stem 46 by a set screw 47. By loosening the set screw 47 the entire gage may be removed instantly from the valve stem, and in replacing the gage, the nut 44 should be tightened after screwing up the set screw 47, in order to insure a tight fit of the rubber packing 48 against the upper rim of the valve stem 46. The rubber packing 48 is prevented from collapsing inwardly by a thin tube 49.

What I claim is:

1. In a pressure gage, a casing, said casing comprising a body portion and a tubular extension on the end of said body portion, a rubber air chamber within said body portion, a compression spring lying partly within said body portion and partly within said tubular extension, one end of said spring bearing against the air chamber, and the other end bearing against the upper end of said tubular extension, and a hollow gage bar over the lower part of said spring and bearing against said air chamber, the gage bar being movable into said tubular extension, the latter being so constructed that the actuated positions of the gage-bar therein may be ascertained.

2. In a pressure gage, a casing, said casing comprising a body portion and a tubular extension on the end of said body portion, a rubber air chamber within said body portion, a compression spring lying partly within said body portion and partly within said tubular extension, and bearing against the outer end of the air chamber and the upper end of said tubular extension, a hollow gage bar over the lower part of said spring and movable by said air chamber, the gage bar being movable into said tubular extension, the latter being so constructed that the actuated positions of the gage-bar therein may be ascertained, a cap on the upper end of said chamber, said cap having a flange receiving the upper end of the air chamber, and having a radial flange of slightly less diameter than the body portion of the casing and forming a guide for the air chamber and parts reciprocated therewith, and a coil spring surrounding said air chamber, the uppermost coil bearing against said latter flange.

3. In a pressure gage, a casing, said casing comprising a body portion and a tubular extension on the end of said body portion, a rubber air chamber within said body portion, a compression spring lying partly within said body portion and partly within said tubular extension and bearing against the air chamber and the upper end of said tubular extension, a hollow gage bar over the lower part of said spring, the gage bar being movable into said tubular extension, the latter being so constructed that the actuated positions of the gage-bar therein may be ascertained, and a cap on the upper end of said air chamber, said gage bar being connected to said cap.

4. In a pressure gage, a casing, said casing comprising a body portion and a tubular extension on the end of said body portion, a rubber air chamber within said casing, a compression spring lying partly within said body portion and partly within said tubular extension and bearing against the air chamber and the upper end of said tubular extension, a hollow gage bar over the lower part of said spring and bearing against said air chamber, the gage bar being movable into said tubular extension, the latter being so constructed that the actuated positions of the gage-bar therein may be ascertained, a tube inclosing the upper end of said spring and telescoping within said hollow gage bar, said tube being retained against the upper end of the tubular extension by said spring.

5. A body adapted to be secured to the valve stem of a tire, a collar secured to said body and externally threaded, a tubular casing comprising a body portion and a tubular extension, said body portion of the casing having its lower end screwed to said collar, said tubular extension having a flanged lower portion screwed to the upper end of said body portion of the casing, a rubber air chamber secured to said body within said body portion of the casing, a hollow gage bar projecting from the upper end of said air chamber into said tubular extension, the latter being so constructed that the actuated positions of the gage-bar therein may be ascertained, a coil spring with its lower portion lying within said gage bar, and the upper portion lying within said tubular extension.

6. In a pressure gage, the combination of a casing, a longitudinally extensible pressure responsive element in said casing, a tubular indicator extending beyond the end of said pressure responsive element, and a spring for resisting movement of said pressure responsive element, said spring being arranged between the end of said pressure responsive element and the upper end of the casing and within said tubular indicator.

7. In a pressure gage, the combination of a casing, a longitudinally extensible pressure responsive element in said casing, a spring for resisting movement of said pressure responsive element, said spring being beyond said pressure-responsive element and being arranged between the end of said pressure responsive element and the upper end of the casing, said spring extending that portion of the length of said casing between the end of the pressure responsive element and the end of the casing, and an indicator outside of said spring actuated by said pressure-responsive element.

8. In a pressure gage, the combination of a casing, a longitudinally extensible pressure responsive element in said casing, a spring for resisting movement of said pressure responsive element, said spring being beyond said pressure-responsive element and being arranged between the end of said pressure responsive element and the upper end of the casing, and an indicator outside of said spring.

9. In a pressure gage, the combination of a casing, a longitudinally extensible pressure responsive element in said casing, a tubular indicator on the end of said pressure responsive element, and a spring for resisting movement of said pressure responsive element, said spring being arranged between the end of said pressure responsive element and the upper end of the casing and within said tubular indicator, and a tubular part fitting over an end of said spring and telescoping with said tubular indicator.

10. In a pressure gage, a casing, said casing comprising a body portion and a tubular extension, a rubber air chamber within said body portion of the casing, said body portion of the casing having its upper end flanged inwardly, forming an opening in said end, a compression spring lying partly within said body portion of the casing and partly within said tubular extension, a gage bar at the upper end of said air chamber, said bar being movable through said opening into said extension, said extension comprising a glass tube, and means for pressing said glass tube against the flanged upper end of the body portion of said casing.

11. A pressure gage comprising a casing, a pressure-responsive member in said casing adapted to move toward the top of said casing under increasing pressures, a compression spring arranged between the pressure-responsive member and the upper end of said casing, a tubular guide for said spring fixed to the upper end of said casing, and an indicating sleeve moved by said pressure-responsive member, said indicating sleeve telescoping with said tubular guide.

12. A pressure gage comprising a casing, a pressure-responsive member in said casing adapted to move toward the top of said casing under increasing pressures, a compression spring arranged between the pressure-responsive member and the upper end of said casing, a tubular guide for said spring fixed to the upper end of said casing, and an indicating sleeve moved by said pressure-responsive member, said indicating sleeve telescoping with said tubular guide, said tubular guide carrying the scale and said casing having a window through which said scale is visible.

13. In a pressure gage, a body adapted to be secured to the valve stem of a tire, a barrel secured to the body, a rubber air chamber secured to the body within said barrel, a follower plate slidable within the barrel and bearing against the upper end of the air chamber, a gage bar slidably supported in the barrel and operatively engaging the follower plate, a compression spring bearing at one end against the follower plate, a transparent tube and a shield secured to the barrel, the outer end of the shield retaining the tube and bearing against the corresponding end of the spring.

14. In a pressure gage, a barrel, a rubber air chamber within said barrel, means for attaching said chamber to said barrel, said barrel having its upper end flanged inwardly forming an opening in said end, a tubular extension on the end of said barrel, said extension having sight openings, a glass tube within said extension, a gage bar at the upper end of said chamber, said bar being movable through said opening into said extension, a spring resisting the outward movement of said chamber, said tubular extension having means for drawing said extension against said glass tube and pressing the latter against the flanged upper end of said barrel.

In testimony whereof, I have hereunto set my hand at Los Angeles, California, this 12 day of October, 1912.

J. A. BOWDEN.

In presence of—
GEORGE T. HACKLEY,
MARTHA M. LANGE.